G. CRAWFORD.
COASTER BRAKE.
APPLICATION FILED AUG. 10, 1910.
992,340.
Patented May 16, 1911.
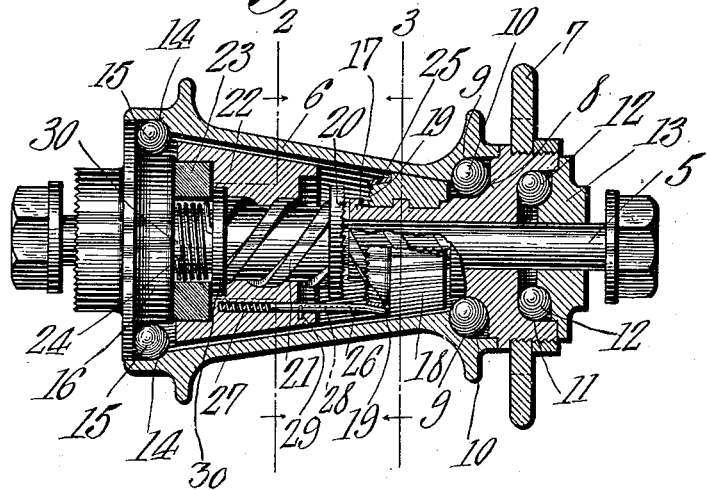
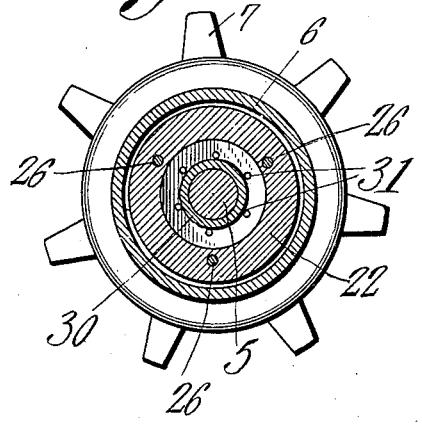
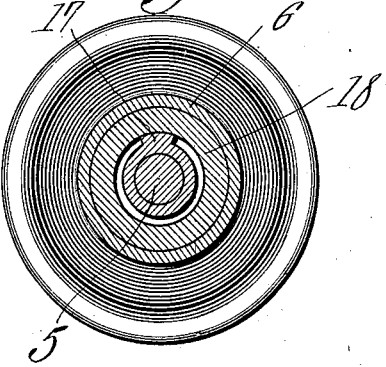
Witnesses
George Crawford,
Inventor
by C. A. Snow & Co.
Attorneys

UNITED STATES PATENT OFFICE.

GEORGE CRAWFORD, OF HOQUIAM, WASHINGTON.

COASTER-BRAKE.

992,340.　　　　　Specification of Letters Patent.　　Patented May 16, 1911.

Application filed August 10, 1910. Serial No. 576,440.

*To all whom it may concern:*

Be it known that I, GEORGE CRAWFORD, a citizen of the United States, residing at Hoquiam, in the county of Chehalis and State of Washington, have invented a new and useful Coaster-Brake, of which the following is a specification.

This invention has for its object to provide in a coaster brake a more positive drive and brake, and also to simplify the structure, and to reduce the number of parts to a minimum.

With these objects in view, the invention consists in a novel construction and arrangement of parts to be hereinafter described and claimed, reference being had to the accompanying drawing forming a part of this specification, in which drawing—

Figure 1 is a longitudinal section of the device. Figs. 2 and 3 are cross sections on the lines 2—2 and 3—3 respectively of Fig. 1.

Referring more particularly to the drawing, 5 denotes the stationary rear axle of a bicycle, motor cycle, or the like, said axle being locked within the rear fork as usual, and carrying the wheel hub 6, the latter being normally loose on the axle, and adapted to be locked to the drive sprocket 7 by the mechanism to be described hereinafter. The sprocket 7 is located on one end of the hub 6, and the hub of the sprocket is formed on one side with a cone 8 which is opposite a cup 9 formed in the corresponding end of the hub 6, and holding anti-friction balls 10. The other side of the sprocket hub is formed with a cup 11 holding anti-friction balls 12, which latter are retained by a cone 13 made fast on the axle 5. The other end of the hub 6 is also provided with a ball bearing, said end being formed with a cup 14 holding anti-friction balls 15, which latter are retained by a cone 16 fixed on the corresponding end of the axle 5. The hub of the sprocket wheel 7 carries a drive screw 17, said screw extending from one side of the sprocket hub into the hub 6. On the screw 17 is mounted, for longitudinal travel, a conical driving clutch member 18, the surface of which is milled or roughened, and adapted to come into frictional contact with the inner surface of the hub 6, the latter also being made conical for this purpose. The member 18 has a toothed clutch face 19 which is opposite a toothed clutch face 20 formed on one end of a brake screw 21 which is loosely mounted on the axle 5 within the hub 6, and in alinement with the drive screw 17. The brake screw 21 is threaded through a conical brake block 22 adapted to come into frictional contact with the inner conical surface of the hub 6. The brake block 22 is prevented from turning on the screw 21 by means of lugs 23 on the cone 16, said lugs extending into recesses made in the end of the brake block. These lugs 23 are made sufficiently long so as not to slip out of the recesses when the brake is applied.

The brake releasing means comprises a spring 24 which is coiled around the axle 5 between the cone 16 and the opposite end of the brake screw 21. One end of the spring 24 is made fast to the cone 16, and its other end is fastened to the screw 21. When the screw 21 is operated to advance the block 22 into braking position, the spring 24 is placed under tension by being wound up, and when the clutch faces 19 and 20 are disengaged to release the screw 21, the spring rotates the screw in a reverse direction to retract the brake block 22.

To insure the traveling of the clutch member 18 on the screw 17, it is necessary that the member be prevented from turning on the screw between the engagement of the clutch faces 19 and 20. To do this, a sleeve 25 is placed around the periphery of the part 19, which sleeve is held in frictional engagement therewith by three spring pressed arms 26 carried by the brake block 22. The brake block 22 has recesses in one of its ends in which the arms 26 are received, and in the inner ends of the recesses are seated coiled springs 27 which engage the inner ends of the arms. The arms 26 are slotted longitudinally as indicated at 28 to receive stop pins or screws 29 carried by the brake block 22. These stop pins 29 limit the forward movement of the arms 26, and prevent frictional contact of the ring 25 with the periphery of the part 19 of the clutch member 18 during the forward drive. That portion of the clutch member 18 which is engaged by the ring 25 is conical, and the ring is tapered accordingly. The ends of the arms 26 which engage the ring 25 are beveled to fit the outer periphery of the ring.

The end thrust of the brake screw 21 is taken up by a collar 30 mounted on the axle 5 which collar bears on the lugs 23. In the collar 30 is an aperture through which the end of the spring 24 passes, and in the end of the screw 21 are a plurality of openings 31 for securing the spring, a plurality of openings being provided to permit adjustment of the spring.

The operation of the mechanism herein described is as follows: The screw 17 rotates with the sprocket 7, so that when pedaling ahead the clutch member 18 comes into frictional engagement with the interior surface of the hub 6, and drives the same forwardly, the member 18 being carried into locking position by traveling lengthwise on the screw 17, toward the right. To coast, the pedals are stopped with a slight reversing movement. The screw 17 partakes of this reverse movement, and causes the clutch member 18 to travel to the left, and thus release the hub 6, so that the latter now runs free. To apply the brake, the pedals are reversed until the member 18 has traveled sufficiently to the left to engage the clutch face 19 with the clutch face 20. The screw 21 is now coupled to the screw 17, and upon continuing the reverse motion of the pedals, the screw 21 is turned in a direction to advance the block 22 lengthwise on said screw, to the right, and thus bring said block into frictional engagement with the interior surface of the hub 6. To release the brake, and resume coasting, the pedals are started ahead just enough to separate the clutch faces 19 and 20, whereupon the spring 24 retracts the brake block 22, and the hub 6 is then released, and runs free. To resume the drive ahead, the pedals are advanced as in ordinary riding, whereupon the clutch member 18 travels to the right, and comes into locking engagement with the hub 6, and the drive is then positive ahead.

What is claimed is:

1. The combination with a wheel hub, of longitudinally movable clutch and brake members in the hub, a driver for the hub, said driver including a screw on which the clutch member is mounted for longitudinal movement, a screw on which the brake member is mounted, and means for coupling the last mentioned screw to the clutch member.

2. The combination with a wheel hub, of longitudinally movable clutch and brake members in the hub, a driver for the hub having a screw on which the clutch member is mounted for longitudinal movement, and a screw on which the brake member is mounted, said screw having a clutch member coacting with the first mentioned clutch member, and being locked thereto when the driver is operated in a reverse direction.

3. The combination with a wheel hub, of longitudinally movable clutch and brake members in the hub, oppositely threaded screws in the hub, one of said screws carrying the clutch member, and the other screw carrying the brake member, a driver connected to the screw of the clutch member, for clutching the same to the hub when driven in one direction, and for disengaging the same when driven in a reverse direction, and means for coupling the screws when the driver is operated in the reverse direction.

4. The combination with a wheel hub, of longitudinally movable clutch and brake members in the hub, screws on which said members are mounted, a driver connected to one of the screws, whereby the clutch member is applied to the hub when said driver is operated in one direction, and disengaged when driven in a reverse direction, and means for connecting the screws when the driver is operated in the reverse direction.

5. The combination with a wheel hub, of longitudinally movable clutch and brake members, the former being engageable with the interior of the hub, and having at one of its ends a clutch face, screws on which the clutch and brake members are respectively mounted, a driver connected to the screw of the clutch member, said member being clutched to the hub when the driver is operated in one direction, and disengaged when the driver is operated in a reverse direction, and a clutch face on one end of the screw of the brake member, said clutch face being opposite to and coacting with the clutch face of the brake member, and said clutch faces being interlocked when the driver is operated in the reverse direction.

6. The combination with a wheel hub, of longitudinally movable clutch and brake members in the hub, a driver including a screw on which the clutch member is mounted for travel, said driver through the screw operating to engage the clutch member with the hub when driven in one direction, and disengaging said member when driven in a reverse direction, means for applying the brake when the driver is operated in the reverse direction, and spring pressed retarding devices upon the brake member engageable with the clutch member for holding the same against rotation on the screw.

In testimony that I claim the foregoing as my own, I have hereto affixed my signature in the presence of two witnesses.

GEORGE CRAWFORD.

Witnesses:
L. L. NEAL,
A. M. DINEEN.